(12) United States Patent
Schulz et al.

(10) Patent No.: US 10,843,590 B2
(45) Date of Patent: Nov. 24, 2020

(54) RELEASE HANDLE AND INTEGRATED WARNING DEVICE

(71) Applicant: LEAR CORPORATION, Southfield, MI (US)

(72) Inventors: Alexander Schulz, Rietberg (DE); Marian Kubatka, Rietberg (DE); Christian Ruthmann, Rietberg (DE); Jörg Sternberg, Rheda-Wiedenbrueck (DE)

(73) Assignee: LEAR CORPORATION, Southfield, MI (US)

( * ) Notice: Subject to any disclaimer, the term of this patent is extended or adjusted under 35 U.S.C. 154(b) by 144 days.

(21) Appl. No.: 16/247,878

(22) Filed: Jan. 15, 2019

(65) Prior Publication Data

US 2019/0217743 A1  Jul. 18, 2019

(30) Foreign Application Priority Data

Jan. 15, 2018 (DE) .......................... 10 2018 200 547

(51) Int. Cl.
*B60N 2/015* (2006.01)
*B60N 2/28* (2006.01)
*E05B 41/00* (2006.01)

(52) U.S. Cl.
CPC ..... *B60N 2/01583* (2013.01); *B60N 2/01508* (2013.01); *B60N 2/01516* (2013.01); *B60N 2/28* (2013.01); *E05B 41/00* (2013.01)

(58) Field of Classification Search
CPC ................ B60N 2/005; B60N 2/01508; B60N 2/01516; B60N 2/01583; B60N 2/28; B60N 2/30; B60N 2/3097; B60N 2/919; E05B 41/00

USPC .......................... 296/65.03, 68.1; 297/378.13
See application file for complete search history.

(56) References Cited

U.S. PATENT DOCUMENTS

| 4,759,580 A * | 7/1988 | Berklich, Jr. ...... | B60N 2/01583 248/503.1 |
|---|---|---|---|
| 7,226,129 B2 | 6/2007 | Brandes et al. | |
| 8,393,682 B2 * | 3/2013 | Hosoda .................. | B60N 2/366 297/378.13 |
| 8,777,315 B2 * | 7/2014 | Lutzka ................... | B60N 2/366 297/378.13 |

(Continued)

FOREIGN PATENT DOCUMENTS

WO  2014207157 A1  12/2014

OTHER PUBLICATIONS

WO2014207157A1, Abstract & Machine Translation.

*Primary Examiner* — Jason S Daniels
(74) *Attorney, Agent, or Firm* — Brooks Kushman P.C.

(57) ABSTRACT

A release lever assembly configured to unlock a lock mechanism of a seat assembly is provided. The release lever assembly may include a lever arm, a cable, and an indicator device. The lever arm may be pivotally connected to the seat assembly. The cable may include a first end that is configured to be fixed to the lever arm and a second end that is configured to be connected to the lock mechanism. The indicator device may extend from the first end of the cable so that when the release lever assembly is mounted on the seat assembly, the lever arm is rotatable to unlock the lock mechanism, and the indicator device is configured to extend out of an aperture defined by the seat assembly when the lock is unlocked.

20 Claims, 4 Drawing Sheets

(56) References Cited

U.S. PATENT DOCUMENTS

| | | | |
|---|---|---|---|
| 8,998,332 B2 * | 4/2015 | Teufel | B60N 2/366 |
| | | | 297/378.13 |
| 9,039,048 B2 | 5/2015 | Mueller et al. | |
| 9,199,554 B2 | 12/2015 | Mueller et al. | |
| 9,290,116 B2 | 3/2016 | Teufel et al. | |
| 10,358,071 B2 | 7/2019 | Repedius et al. | |
| 2019/0031068 A1 * | 1/2019 | Pasternak | B60N 2/20 |

* cited by examiner

RELEASE HANDLE AND INTEGRATED WARNING DEVICE

CROSS-REFERENCE TO RELATED APPLICATIONS

This application claims foreign priority benefits under 35 U.S.C. § 119(a)-(d) to DE 10 2018 200 547.8, filed Jan. 15, 2018, the disclosure of which is hereby incorporated by reference in its entirety.

TECHNICAL FIELD

The present disclosure relates to release handles for vehicle seats, particularly those that provide a visual indication of the locking status of the seat.

BACKGROUND

Vehicles such as sport utility vehicles or vans often include second and third row removable seats that are secured to a bolt or striker attached to a vehicle floor. For example, U.S. Pat. No. 6,039,401 discloses a latch mechanism connected to a front portion of a vehicle seat and a bracket that is rotatable to engage and disengage a latch rod connected to the vehicle floor.

SUMMARY

According to one embodiment of this disclosure, a release lever assembly configured to unlock a lock mechanism of a seat assembly is provided. The release lever assembly may include a lever arm, a cable, and an indicator device. The lever arm may be pivotally connected to the seat assembly. The cable may include a first end that is configured to be fixed to the lever arm and a second end that is configured to be connected to the lock mechanism. The indicator device may extend from the first end of the cable so that when the release lever assembly is mounted on the seat assembly, the lever arm is rotatable to unlock the lock mechanism, and the indicator device is configured to extend out of an aperture defined by the seat assembly when the lock is unlocked.

According to another embodiment of this disclosure, a seat assembly is provided. The seat assembly may include a latch mechanism and a handle assembly. The handle assembly may include a handle pivotally connected to a portion of the seat, a cable having a first end connected to the handle and a second end connected to the latch mechanism, and an indicator device extending from the first end of the cable. The handle may be rotatable to unlock the latch mechanism and to cause the indicator device to extend from an aperture defined by the seat assembly.

According to yet another embodiment of this disclosure, a seat for use with a vehicle having an engagement member is provided. The seat may include a latch mechanism that may include a latch that is movable between first and second positions. The latch may be configured to be in a latched position with respect to the engagement member when the latch is in the first position and be in an unlatched position with respect to the engagement member when the latch is in the second position. The seat may also include a handle assembly that may be operatively connected to the latch mechanism. The handle assembly may include a handle enclosure that defines an aperture, a handle pivotally connected to the enclosure and rotatable in first and second opposite directions. The handle assembly may further include a cable having a first end connected to the handle and a second end connected to the latch mechanism. An indicator device may extend from the first end of the cable so that when the handle is rotated in the second direction to enable the latch to move towards the second position, the indicator device extends from the handle enclosure through the aperture.

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Figure 1:
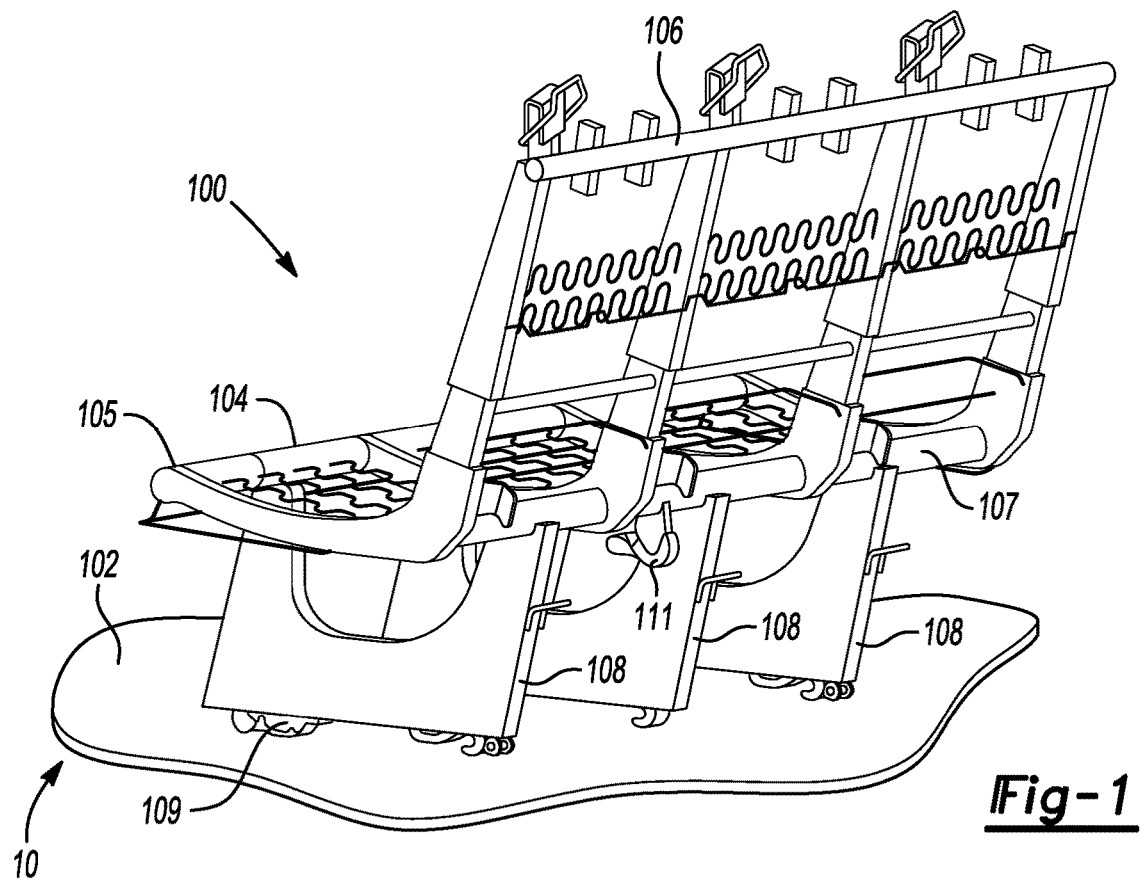
FIG. 1 is a perspective view of a vehicle seat assembly that includes the release lever assembly.

FIG. 1 shows a vehicle seat or seat assembly 100 in accordance with the present disclosure, which may be coupled to a vehicle body 10 in any suitable manner. For example, the seat assembly 100 may be attached directly or indirectly to the floor 102 of the vehicle body 10. The seat assembly 100 includes a seat bottom 104, a seat back 106, and seat stanchions 108 each connected to the seat bottom 104. The seat bottom 104 and seat back 106 may each include any suitable cushion material (not shown), such as foam padding, and any suitable cover material (not shown), such as cloth, leather, vinyl, or any combination thereof, positioned over the cushion material.

The seat assembly 100 may also include one or more locking devices, such as latches, lock mechanisms, or latch mechanisms, that are configured to releasably couple the seat assembly 100 to the vehicle body 10, such as the floor 102 or side portions of the vehicle body 10. In the embodiment shown in FIGS. 1-2, the seat assembly 100 is provided with driver-side and passenger-side locking devices, such as floor latch mechanisms or latches 109, (only the driver-side latch is visible) that are each engageable with an engagement member, such as a bolt or striker 113 that is attached to the vehicle floor 102. The latches 109 are each movable between a first latched position and a second unlatched position. Because the latches 109 may have the same or similar configuration (e.g., they may have symmetrically opposite configurations, i.e. mirrored configurations), only one latch 109 will be described below in further detail.

As another example, the seat assembly 100 may be provided with one or more locking devices that are each engageable with a side portion of the vehicle body 10.

Referring to FIGS. 1-5, the vehicle seat assembly 100 may also include a release assembly, such as a release lever assembly or handle assembly 111. The handle assembly 111 may be connected to the seat bottom 104, as illustrated, or another portion of the seat assembly 100, e.g., seat back 106 or seat stanchions 108. The handle assembly 111 is operatively connected to the latch 109 by a cable 119 to unlatch or latch the latch 109. The handle assembly 111 may include a handle enclosure 132 that defines an aperture, such as an indicator outlet 136, and a handle 130 that is received by the handle enclosure 132. The handle 130 is pivotally connected to the enclosure 132 so that the handle 130 is rotatable in first and second opposite directions. The cable 119 includes a first end 119a connected to the handle 130 and a second end 119b connected to the latch 109. Rotating the handle in the first direction enables the latch 109 to move from the second unlatched position to the first latched position. Rotating the handle 130 in the second direction enables the latch 109 to move from the first latched position to the second unlatched position. Note for the purposes of this disclosure, the terms "first" and "second" are interchangeable and are not meant to be limiting.

Figure 4:
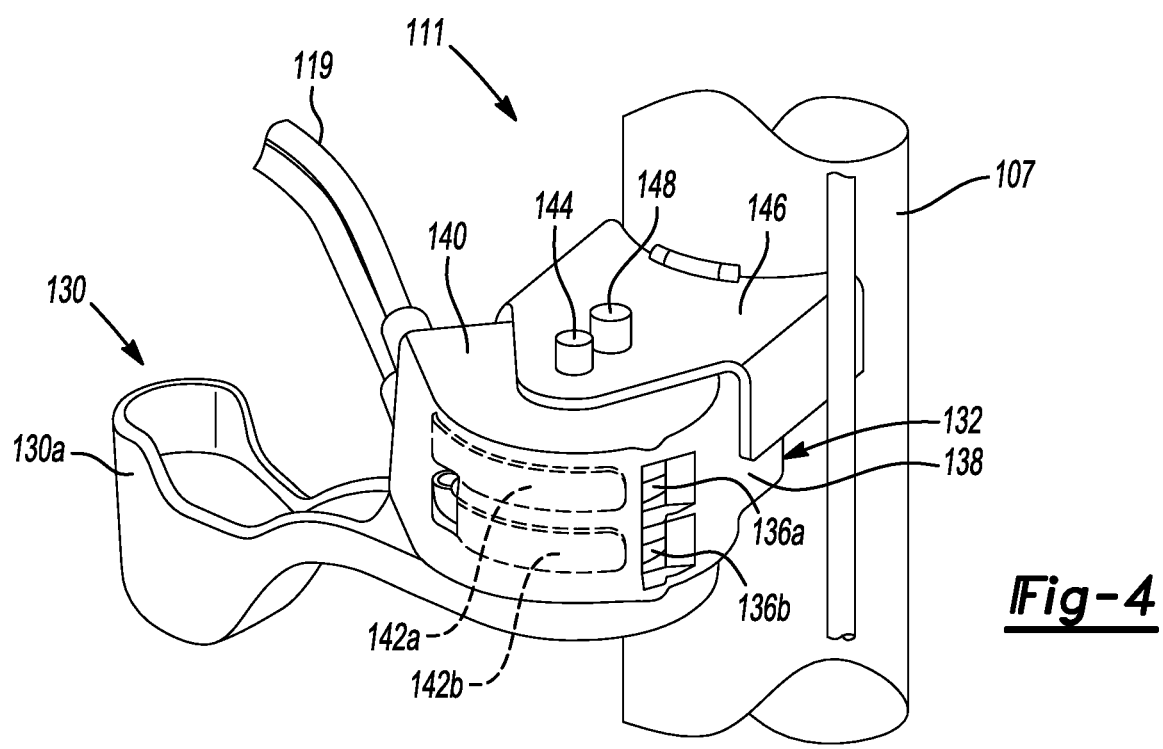
FIG. 4 is a bottom-perspective view of the release lever assembly.

In a first embodiment, the handle assembly 111 is operable to release one latch 109. If the vehicle seat assembly 100 includes more than latch 109, more than one handle assembly 111 may be employed. In a second embodiment, the handle assembly 111 is operable to release two latches 109 (i.e. driver-side and passenger-side). For example, a cable splitter may be disposed between the two latches 109 and the cable 119 that is connected to the handle assembly 111. Alternatively, the handle assembly 111 may be connected to the latches 109 by two cables 119 (one cable per latch 109), as illustrated in FIG. 4 and discussed in greater detail below.

An indicator device or indicator apparatus, such as an indicator flag 142, extends from the first end of the cable 119a. As the handle 130 is rotated in the second direction to enable the latch 109 to move toward the second position, the indicator flag 142 extending from the cable 119 moves through the indicator outlet 136 of the handle enclosure 132. With such a configuration, the position of the indicator flag 142 may be used to indicate the status or position (latched or unlatched) of the latch 109. For example, when the indicator flag 142 extends through the indicator outlet 136, the latch 109 is in the unlatched position or unlocked, and when the indicator flag 142 is retracted into the handle enclosure 132, the latch 109 is in the latched position or locked. In another embodiment, the indicator flag 142 extending through the indicator outlet may indicate that the latch 109 is locked.

Figure 3:
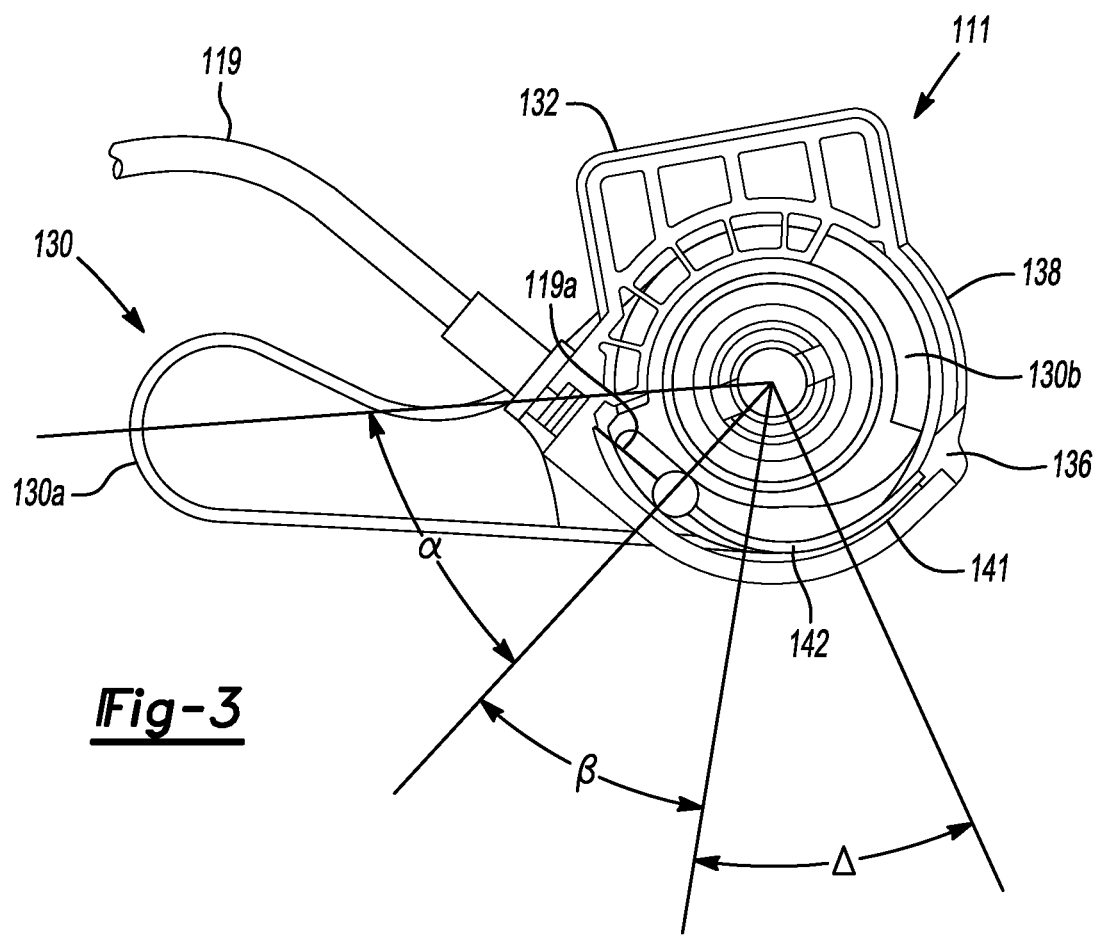
FIG. 3 is a side view of the handle release lever assembly.

The handle 130 may include an elongated grip portion that extends between a free end 130a and a circular end 130b. The circular end 130b of the handle 130 is received by the handle enclosure 132. When the handle is in a home position, as shown in FIGS. 1 and 3, the free end 130a of the handle 130 may be oriented towards a front crossmember 105 of the seat bottom. Furthermore, when the handle 130 is in the home position, the latch 109 may be in the latched position.

In another embodiment, the handle may be a rotary knob that is rotatable to latch and unlatch one or more latches 109.

Referring to FIGS. 3 and 4, the handle enclosure 132 may include one or more sidewalls 140 that are connected, either directly or indirectly to a portion of the vehicle seat 100. For example, the handle enclosure 132 may be connected to a rear crossmember 107 of the seat bottom 104. Alternatively, the handle enclosure 132 may be connected to the seat back 106 or stanchions 108. The handle enclosure 132 may also include a curved peripheral wall 138 that extends between the sidewalls 140. The curved peripheral 138 wall includes a curved inner surface 141 that terminates at the indicator outlet 136. The indicator flag 142 may lie along the curved inner surface 141 when the handle is stationary and the latch 109 is locked. As the handle 130 is rotated, the indicator flag may move along the inner surface 141, either towards the outlet 136 or away from the outlet 136.

The indicator flag 142 may be comprised of a semi-rigid material to facilitate its movement along the curved inner surface 141 of the curved peripheral wall 138. As one example, the indicator flag 142 may be made of or comprise a plastic material such as a thermoplastic, thermoset plastic, or other polymeric material. In another embodiment, the indicator flag may be made of or comprise a fabric. For example, the fabric may have a knit construction or a woven construction, such as a webbing.

According to one embodiment, the handle assembly 111 may be connected to the rear crossmember 107 of the seat bottom 104 by a mounting bracket 146. As illustrated in FIG. 4, for example, the handle enclosure 132 may include a protrusion 148 that engages an aperture defined by the mounting bracket 146. Additionally, the handle 130 may be pivotally mounted to the handle enclosure 132 by a pivot shaft 144.

Figure 2:
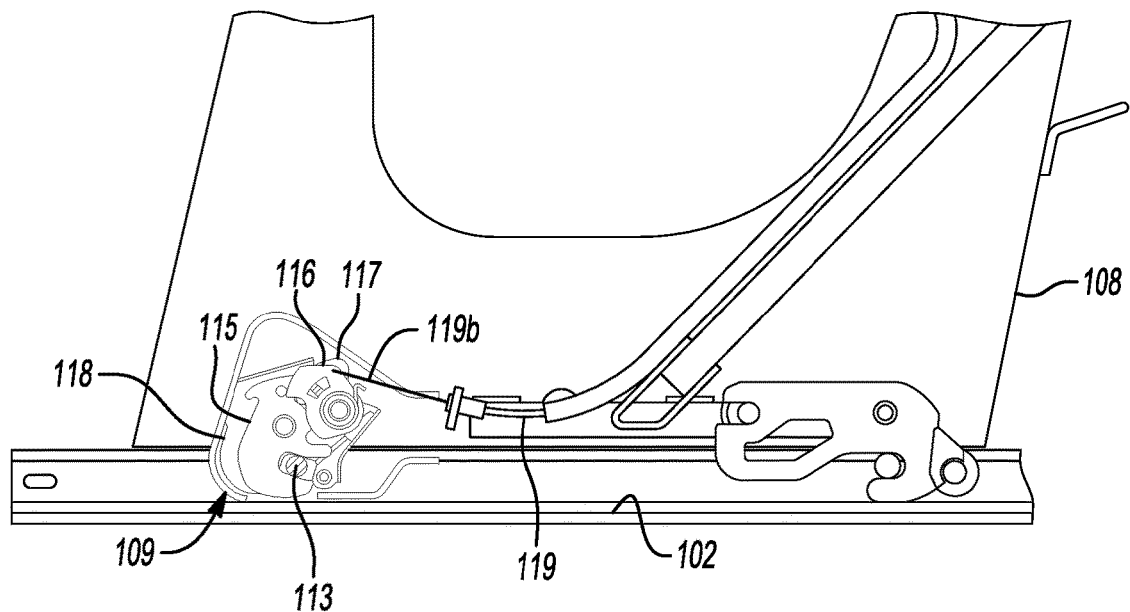
FIG. 2 is a partial cross-sectional view of the vehicle seat assembly.

Referring to FIGS. 2 and 5, the latch 109 may include a locking member such as a pawl 115 that is engageable with the striker 113 when the latch 109 is in the first latched position. The latch 109 may also include a cam 116 that cooperatively engages the pawl 115 so that the pawl moves to the first latched position to engage the striker when the release handle 111 is in the latched position. The cam 116 is connected to the second end 119b of the cable 119 so that when the handle 130 is rotated in one direction, the cable 119 is actuated to rotate the cam 116 to enable the pawl 115 to disengage from the striker 113 so that it is unlatched. A spring 123 may engage and bias the cam 116 to engage the pawl 115 in the latched position. The latch 109 may also include a cover 118 that surrounds or covers the inner components of the latch 109. The latch 109 may also include a spacer 117 that is disposed between the cover 118 and the cam 116. When the latch 109 is in the latched position, as illustrated in FIGS. 5A and 5B, the spacer 117 lies against the cam 116 and is spaced apart from the cover 118. The spacer 117 is sandwiched between the cam 116 and the cover 118 as the handle 130 is rotated from the latched position to the unlatched position. The spacer 117 may be comprised of a compressible material, e.g., rubber, so the force required to rotate the handle is relatively constant.

Figure 5A:
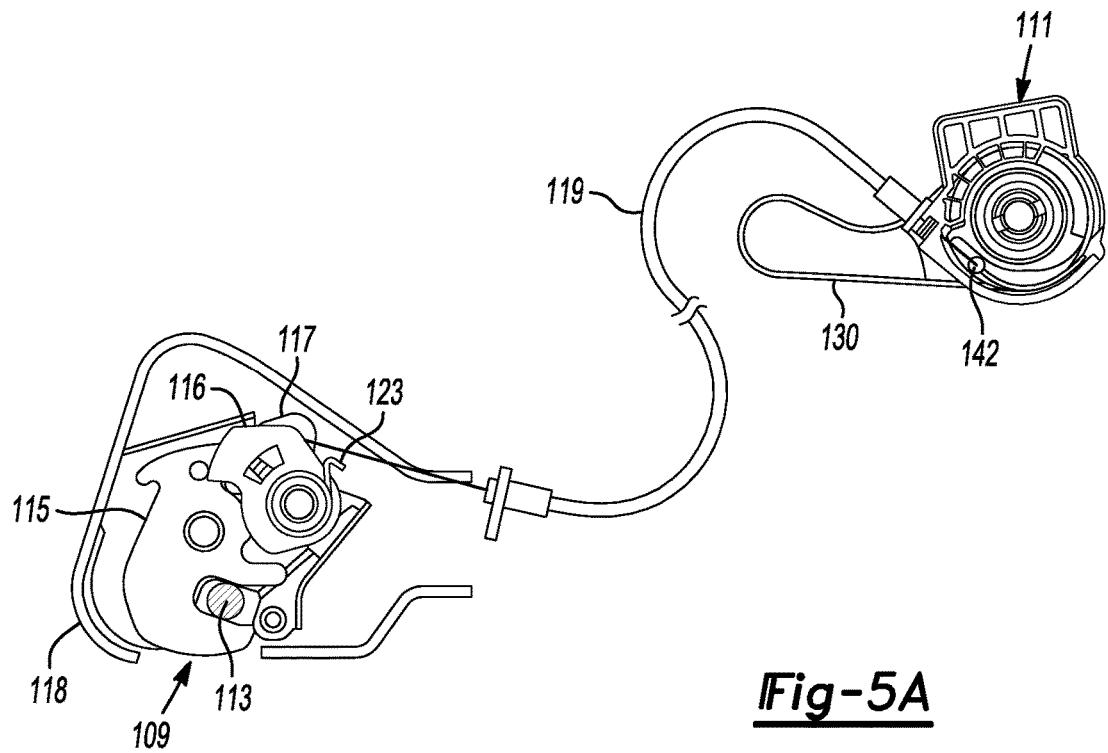
FIGS. 5A-5D are side views of the release lever assembly and latch assembly in various positions.
Figure 5B:
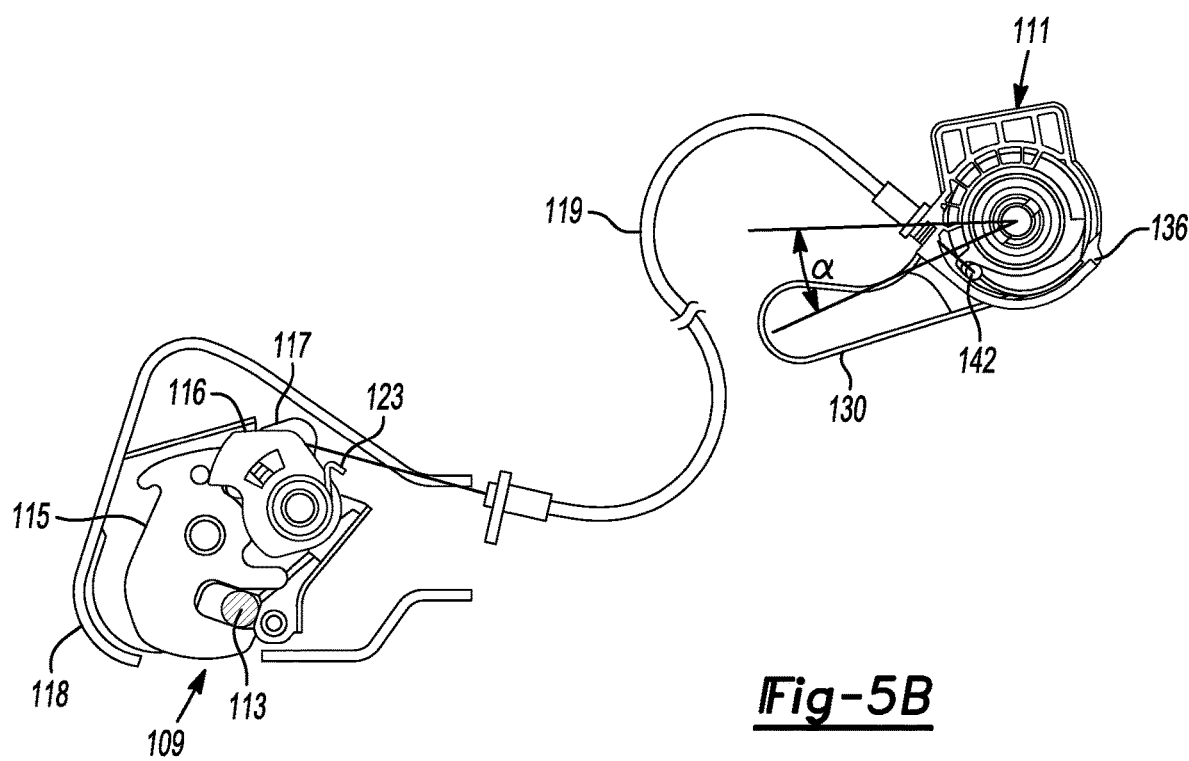
Figure 5C:
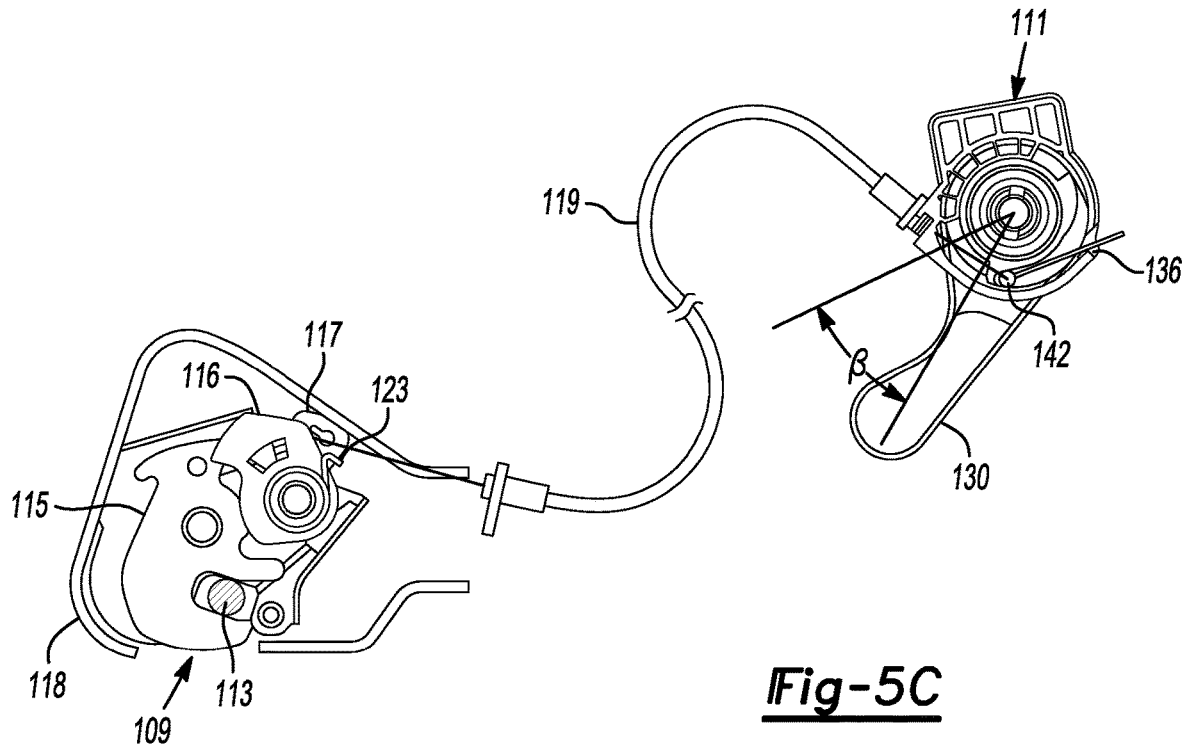
Figure 5D:
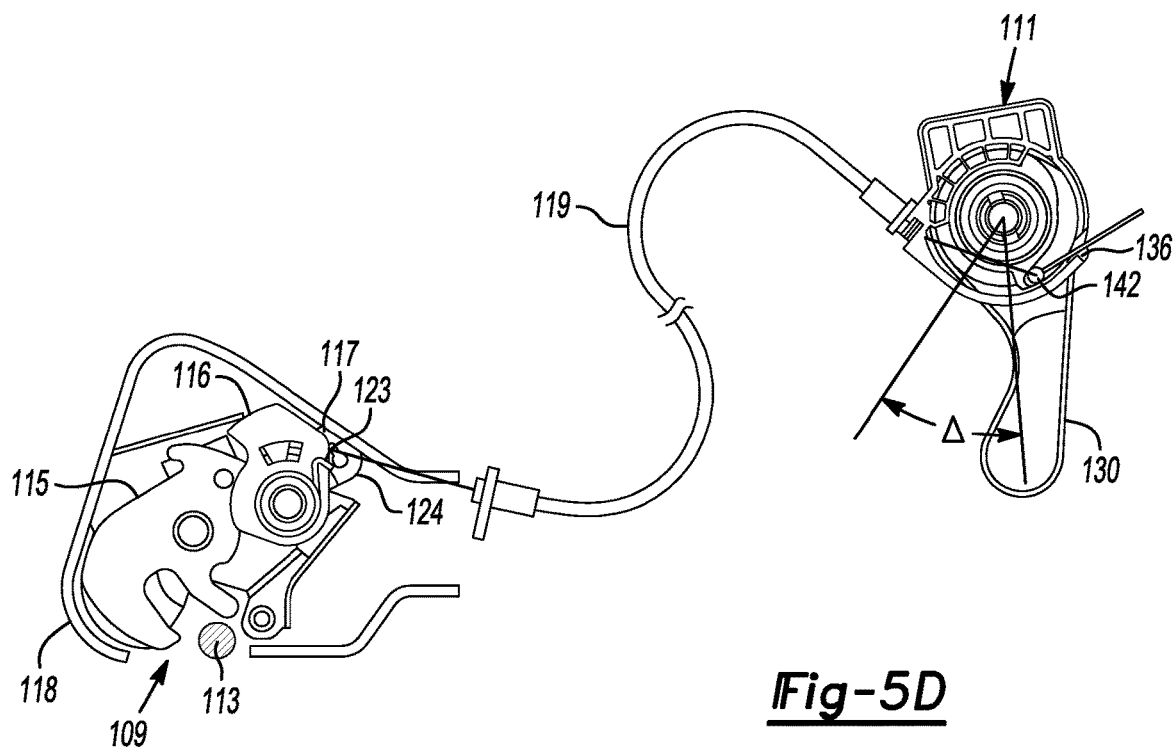

The handle 130 may be incrementally rotated to alter the status of the latch 109. More specifically, the handle 130 may be rotated through a first angle $\alpha$ without moving the indicator flag 142 towards the indicator outlet 136 without unlatching the latch 109, as illustrated in FIG. 5B. This may be referred to as idle travel, and may prevent unintentionally unlocking the latch 109. The handle 130 may be further rotated through a second angle $\beta$ so that a portion of the indicator flag 142 extends through the aperture 136, as illustrated in FIG. 5C. Rotating the handle 130 through the second angle $\beta$, disengages the cam 116 from the pawl 115, to allow the seat to be tilted rearwardly to disengage the pawl 115 from the striker 113. More specifically, as the seat is tilted rearwardly, the pawl 115 moves away from the floor and the striker 113 and rotates to disengage from the striker 113. In another embodiment, a spring bias the pawl 115 towards the striker 113 so that the pawl engages the striker 113. The handle 130 may be rotated further through a third angle $\Delta$ so that the indicator flag 142 further extends through the aperture 136, as illustrated in FIG. 5D.

According to a third embodiment, the handle assembly 111 may include two cables 119 and two indicator flags 142a 142b extending therefrom, as illustrated in FIG. 4. Each cable 119 may be operatively connected to one of the latches

109. In this embodiment, the handle enclosure 132 defines two apertures, such as indicator outlets 136a 136b, and rotation of the handle 130 results in actuation of the latches and movement of the indicator flags 142a and 142b. Elements of the third embodiment that are common with the first embodiment have the same characteristics and function as the elements of the first embodiment, so the description of those common elements applies to the description of the third embodiment.

While exemplary embodiments are described above, it is not intended that these embodiments describe all possible forms according to the disclosure. Rather, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A release lever assembly configured to unlock a lock mechanism of a seat assembly, the release lever assembly comprising:
    a lever arm pivotally connectable to the seat assembly;
    a cable including a first end configured to be fixed to the lever arm and a second end configured to be connected to the lock mechanism; and
    an indicator device extending from the first end of the cable;
    wherein, when the release lever assembly is mounted on the seat assembly, the lever arm is rotatable to unlock the lock mechanism, and the indicator device is configured to extend out of an aperture defined by the seat assembly when the lock mechanism is unlocked.

2. The release lever assembly of claim 1 further comprising:
    a lever arm enclosure connectable to the seat assembly, wherein a first end of the lever arm is received by and pivotally connected to the lever arm enclosure, and wherein the lever arm defines an elongated grip portion that extends from the first end.

3. The release lever assembly of claim 2, wherein the lever arm enclosure defines the aperture and the indicator device is configured to extend out of the aperture when the release lever assembly and the lock mechanism is unlocked.

4. The release lever assembly of claim 3 wherein the lever arm enclosure includes a curved peripheral wall that defines a curved inner surface that terminates at the aperture, wherein the indicator device comprises a semi-rigid material and is configured to lie along the inner surface when the lock mechanism is unlocked.

5. The release lever assembly of claim 4 wherein the indicator device is positioned relative to the aperture so that rotation of the lever arm is proportionally related to a distance the indicator device extends out of the aperture.

6. The release lever assembly of claim 3 wherein the lock mechanism includes a pawl and a cam operatively connected to the second end of the cable so that as the lever arm rotates the cam rotates and disengages the pawl to allow the lock mechanism to unlock.

7. The release lever assembly of claim 1 further comprising:
    a second cable including a first end configured to be fixed to the lever arm and a second end configured to be connected to a second lock mechanism of the seat assembly; and
    a second indicator device extending from the first end of the second cable;
    wherein, when the release lever assembly is mounted on the seat assembly, the lever arm is rotatable to unlock the second lock mechanism, and the second indicator device is configured to extend out of a second aperture defined by the seat assembly when the second lock mechanism is unlocked.

8. A seat assembly comprising:
    a latch mechanism; and
    a handle assembly operatively connected to the latch mechanism, the handle assembly including;
        a handle pivotally connected to a portion of the seat assembly;
        a cable having a first end connected to the handle and a second end connected to the latch mechanism; and
        an indicator device extending from the first end of the cable;
        wherein the handle is rotatable to unlock the latch mechanism and to cause the indicator device to extend from an aperture defined by the seat assembly.

9. The seat assembly of claim 8 further comprising:
    a handle enclosure connected to the portion of the seat, assembly wherein the handle enclosure receives the handle and defines the aperture.

10. The seat assembly of claim 9 wherein the handle includes a circular end and an elongated grip portion extending from the circular end, wherein the circular end is received by the handle enclosure.

11. The seat assembly of claim 9 wherein the handle enclosure includes sidewalls connected by a curved peripheral wall, the curved peripheral wall defines a curved inner surface that terminates at the aperture, and the indicator device is configured to lie along the curved inner surface when the latch mechanism is locked.

12. The seat assembly of claim 11 wherein the indicator device comprises a semi-rigid material so that a portion of the indicator device lies along the curved inner surface when the latch mechanism is unlocked.

13. The seat assembly of claim 8 wherein the latch mechanism includes:
    a pawl configured to engage a striker when the latch mechanism is in a locked position; and
    a cam configured to engage the pawl when the latch mechanism is in the locked position, wherein the cam is connected to the second end of the cable so that when the handle is rotated in one direction the cam is rotated to disengage the pawl to allow the latch mechanism to unlock.

14. The seat assembly of claim 13 further comprising:
    a spring that biases the cam to engage the pawl when the latch mechanism is in the locked position.

15. A seat for use with a vehicle having an engagement member, the seat comprising:
    a latch mechanism including a latch that is movable between first and second positions, wherein the latch is configured to be in a latched position with respect to the engagement member when the latch is in the first position, and the latch is configured to be in an unlatched position with respect to the engagement member when the latch is in the second position; and
    a handle assembly operatively connected to the latch mechanism, the handle assembly including:
        a handle enclosure that defines an indicator outlet;
        a handle pivotally connected to the enclosure and rotatable in first and second opposite directions;
        a cable having a first end connected to the handle and a second end connected to the latch mechanism; and an indicator device extending from the first end of the cable;

wherein the handle is rotatable in the second direction to enable the latch to move toward the second position and to cause the indicator device to extend from the handle enclosure through the indicator outlet.

16. The seat of claim 15, wherein the handle is pivotable through a first angle to move the indicator device towards the indicator outlet without moving the latch from the first position to the second position.

17. The seat of claim 15, further comprising:

a seat bottom including a front crossmember and a rear crossmember;

a seatback connected to the rear crossmember of the seat bottom; and a mounting bracket extending from the rear crossmember, wherein the handle enclosure and the handle are connected to the mounting bracket.

18. The seat of claim 17, wherein the handle includes an elongated grip portion that extends towards the front crossmember when the handle is in a home position and the latch is in the first position.

19. The seat of claim 18, wherein the handle is rotatable from the home position through a first angle so that a first portion of the indicator device extends through the indicator outlet.

20. The seat of claim 19, wherein the handle is rotatable from the first angle through a second angle so that the first portion and a second portion of the indicator device extend through the indicator outlet.

* * * * *